Patented Jan. 10, 1928.

1,655,868

UNITED STATES PATENT OFFICE.

ANSEL M. KINNEY, OF CHICAGO, ILLINOIS, ASSIGNOR TO STANDARD OIL COMPANY, OF WHITING, INDIANA, A CORPORATION OF INDIANA.

ART OF PREPARING LEATHER.

No Drawing. Application filed March 23, 1925. Serial No. 17,840.

The present invention relates to improvements in the fat liquoring of tanned leathers, and will be fully understood from the following description thereof.

In accordance with the present invention, the tanned hide, while wet, is subjected to the action of dilute emulsion containing a suitable oily agent, together with a suitable proportion of oil soluble sulfonic compounds derived from the treatment of mineral oils (particularly lubricant oils) with strong sulfuric acid; that is, sulfuric acid of 66° Baumé or stronger, such as fuming sulfuric acid. The oil employed may be mineral oil, such as straw oil or mineral seal oil, or a fatty oil, or mixtures of the two. Sulfonated fatty oils may likewise be employed. Thus, neat's-foot oil, lard oil, cod oil, castor oil, moelle degras, or sulfonated compounds of these oils may be employed, either alone or together with mineral oil, the oil being selected in accordance with the nature of the leather desired.

In preparing the fat liquor, the oil to be employed is mixed with the oil soluble sulfonic compound (preferably a sodium salt thereof), and, if desired, a soap such as a soda rosin soap, and the resulting liquid is admixed with water to form a dilute emulsion. Thus, a mixture containing from 10 to 15% of the oil soluble sodium sulfonic compound, from 0 to 8% of a soda rosin soap and oil, together with small proportions of alcohol and water (say about 2% of each) is emulsified in water in the proportions of about one pint of said mixture to five gallons of water. A suitable mixture for preparing such an emulsion is, for example, one containing 12% of sodium sulfonic compounds of the character described, 6% of soda rosin soap, 2% of alcohol, 2% of water and 78% of oil, which may be mineral oil or a mixture of mineral oil with neat's-foot oil or other suitable leather fatting oil. In the process of fat liquoring, from 15 to 30 minutes are required in the drum to produce the desired effect. The sulfonic compounds are found to act as driving agents, and to materially accelerate the rate of absorption of the oil or fat by the tanned leather.

I claim:

1. The method of fat liquoring tanned hides which comprises subjecting tanned hides to the action of an oily material in emulsion in water in the presence of oil soluble sulfonic compounds derived from the treatment of mineral oils with strong sulfuric acid.

2. The method of fat liquoring tanned hides which comprises subjecting such hides to the action of an aqueous emulsion containing a mineral oil and an oil soluble sulfonic compound derived from the action of strong sulfuric acid on hydrocarbon oils.

3. The method of preparing a fat liquor for treating hides comprising forming a mixture containing oil, 10 to 15% of sodium sulfonic compounds of the oil soluble type derived from the treatment of hydrocarbon oils with strong sulfuric acid, alcohol, water, and not more than 8% of soap, and emulsifying such mixture in water.

4. The method of preparing a fat liquor for treating hides comprising forming a mixture containing oil, 10 to 15% of sodium sulfonic compounds of the oil soluble type derived from the treatment of hydrocarbon oils with strong sulfuric acid, alcohol and water, and emulsifying such mixture in water.

ANSEL M. KINNEY.